A. J. BORST, Jr.
SEMITRAILER.
APPLICATION FILED JUNE 19, 1919.
1,383,381.
Patented July 5, 1921.
2 SHEETS—SHEET 2.
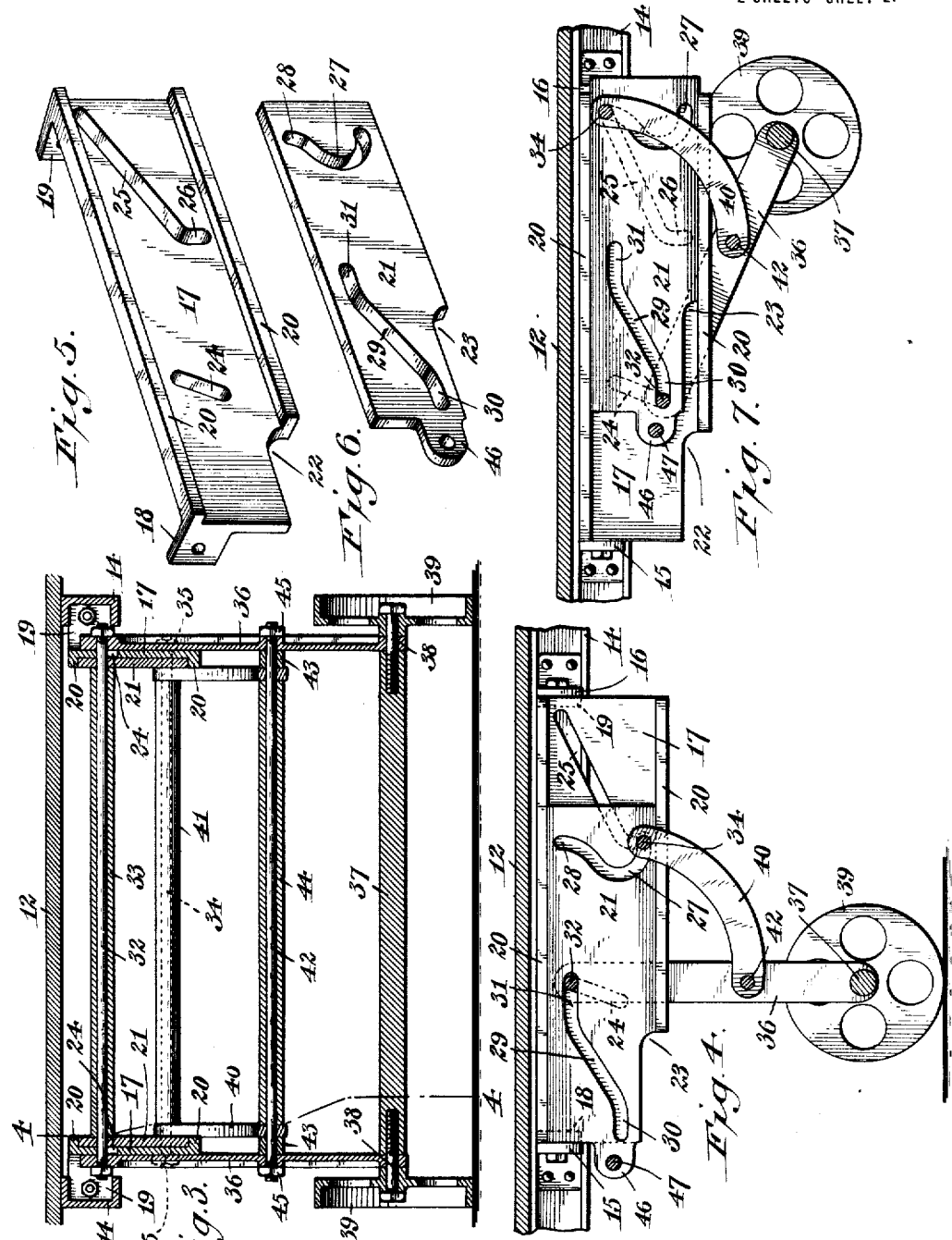
Witness:
Jacob Oberst Jr.
Andrew J. Borst, Jr., Inventor.
By Emil Kunkart
Attorney.

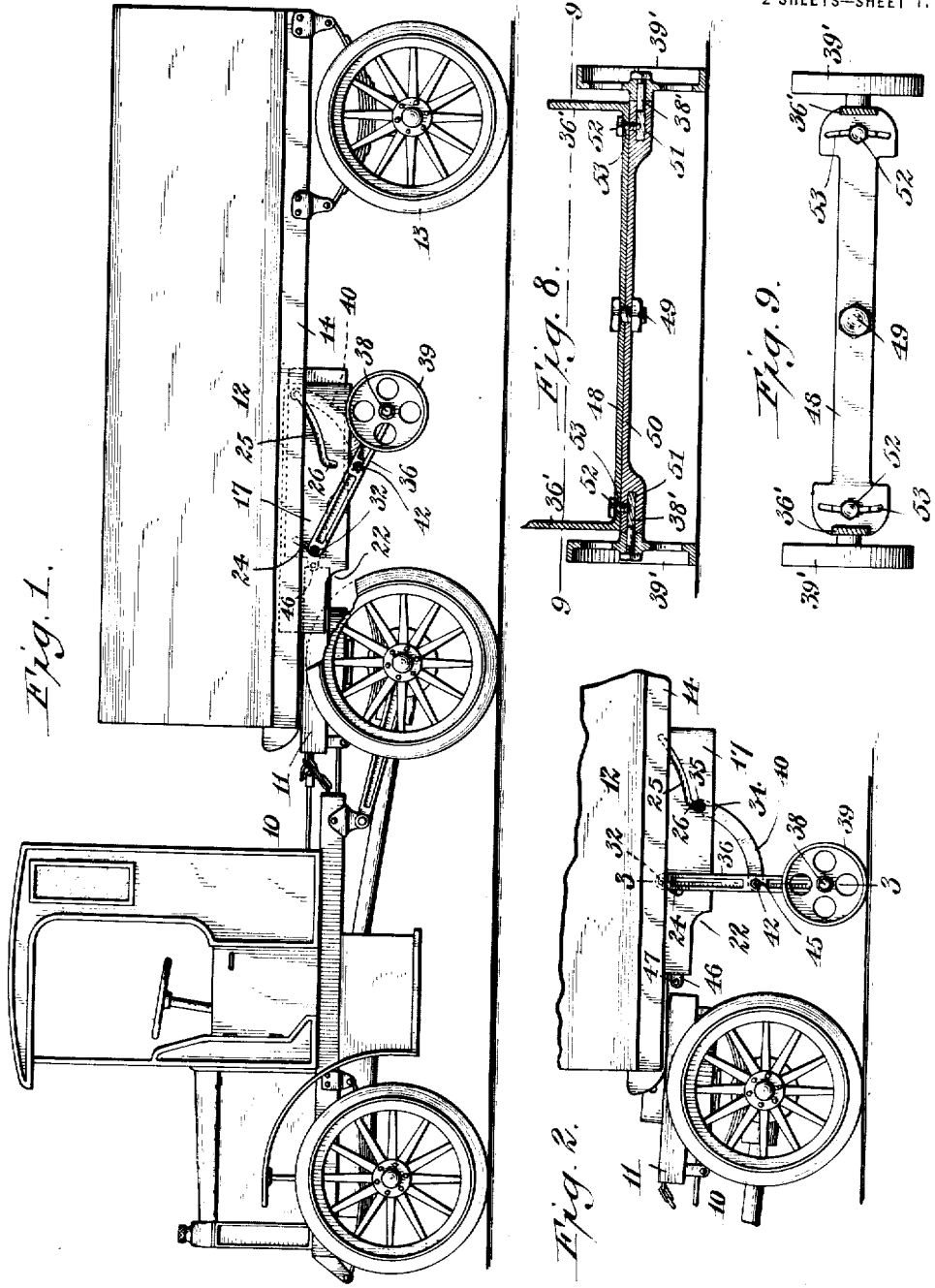

UNITED STATES PATENT OFFICE.

ANDREW J. BORST, JR., OF BUFFALO, NEW YORK.

SEMITRAILER.

1,383,381.  Specification of Letters Patent.  Patented July 5, 1921.

Application filed June 19, 1919. Serial No. 305,287.

*To all whom it may concern:*

Be it known that I, ANDREW J. BORST, Jr., a citizen of the United States, residing at Buffalo, in the county of Erie and State of New York, have invented certain new and useful Improvements in Semitrailers, of which the following is a specification.

My invention relates to improvements in semi-trailers, and more particularly to means for supporting the front end of semi-trailers when disconnected from a tractor.

One of the objects of my invention is the provision of improved means for supporting the front end of a semi-trailer capable of being swung out of supporting position when the front end is carried by a tractor.

Another object of my invention is the provision of supporting means of this type which will automatically be moved into inoperative position when backing a tractor under the front end of the semi-trailer.

Another object is to provide means of this kind, which will be automatically locked when swung into either of its two extreme positions, namely that in which the supporting mechanism is held elevated, or in its inoperative position, and that in which it is lowered or held in operative or supporting position.

A further object of my invention is the provision of supporting mechanism of this kind, which will permit the trailer to be directed to the right or left when moved about while disconnected from a tractor.

A still further object of my invention is to provide simple, durable, and effective supporting means of improved construction, whereby the front end of the semi-trailer may be supported preparatory to loading the same and, when loaded, connected to and supported by the rear end of a tractor.

With these and other objects in view, the invention consists in the novel features of construction and in the arrangement and combination of parts to be hereinafter described and more particularly pointed out in the subjoined claims.

In the drawings:

Figure 1 is a side elevation of a trailer having its front end equipped with my improved supporting mechanism and supported by the rear end of a tractor, the supporting mechanism being in elevated or inoperative position.

Fig. 2 is a side elevation of the rear end of a tractor and the front end of a trailer showing the front end of the trailer supported by means of my improved supporting mechanism and the tractor in a position which it will assume with reference to the trailer when being moved underneath the trailer to automatically elevate the supporting mechanism.

Fig. 3 is an enlarged transverse section through the supporting mechanism taken on line 3—3, Fig. 2.

Fig. 4 is a longitudinal section taken on line 4—4, Fig. 3.

Fig. 5 is a perspective view of one of the slide guides.

Fig. 6 is a perspective view of one of the actuator slides.

Fig. 7 is a longitudinal section taken on line 4—4, Fig. 3, showing the supporting mechanism in elevated or inoperative position.

Fig. 8 is a transverse section through the lower end of the supporting mechanism showing a modified form of my invention.

Fig. 9 is a horizontal section taken on line 9—9, Fig. 8.

Reference being now had to the drawings in detail, like numerals refer to like parts in the several figures.

The reference numeral 10 designates a tractor which may be of any form and construction, but which has preferably a platform 11 at its rear end capable of swinging on a horizontal pivot disposed transversely of the tractor so that the platform will be tilted rearwardly, as is common in tractors adapted for supporting the front end of semi-trailers; the principle under which this platform is constructed and supported being well known to those familiar in the art.

The trailer, or more particularly "semi-trailer," so commercially termed by reason of the fact that the front end is adapted to be supported on a tractor, is designated by the numeral 12, and it may have any form of body and the usual rear traction wheels 13. To the chassis of this semi-trailer I secure my improved supporting mechanism whereby the front end of the trailer is supported when disconnected from a tractor. This chassis has the usual side beams 14 and to each of these side beams, inwardly-directed lugs 15, 16 are secured. Arranged parallel with the side bars are two slide guides 17, each having outstanding lugs 18, 19 at opposite ends secured, respectively, to the inwardly-directed lugs 15, 16 of the side beams 14, thus fastening the slide guides to the chassis. Each slide guide is provided along its upper and lower edges with inwardly-directed flanges 20, and slidably arranged against the inner side of each slide guide with the upper and lower edges thereof in contact with said inwardly-directed flanges are actuator slides 21.

At their front ends, the slide guides 17 are cut away along their lower edges, as at 22, to enable the tractor to move rearwardly the required distance underneath the semi-trailer, and the actuator slides 21 are similarly cut away along their lower edges at the front thereof, as at 23. Each of the slide guides has an upwardly and rearwardly-directed slot 24 at a distance from the front end of the guide, and at its rear end it has an upwardly and rearwardly directed slot 25 extending to a point near its rear end and terminating at its front or lower end in a vertical extension 26. The slots 24 of the two slide guides are in transverse alinement, and the slots 25 are similarly arranged. Each actuator slide has an arcuate slot 27 near its rear end, which terminates at its upper end in a substantially vertical extension 28, and arranged in its front portion is an inclined slot 29 having its front and rear ends terminating in horizontal portions 30, 31, respectively, with the rear horizontal portion in a higher plane than the front horizontal portion.

The arcuate slots 27 of the two actuator slides are in transverse alinement and some portion of each arcuate slot is at all times alined with portions of one of the upwardly and rearwardly directed slots 25 at the rear ends of the slide guides. The inclined slots 29 of said actuator slides are also in transverse alinement and have at all times some portions thereof in alinement with the upward and rearwardly-directed slots 24 of said slide guides.

Arranged transversely of the chassis and slidable in the upwardly and readwardly-directed slots 24 of the slide guides is a pivot bolt 32, around which a spacing tube or sleeve 33 is passed, opposite ends of which are in contact with the inner faces of the actuator slides 21 arranged at opposite sides of the chassis, as best shown in Fig. 3, and slidable within the arcuate and upwardly and rearwardly-directed slots 27, 25, respectively, is a guide bolt 34, opposite ends of said bolts having nuts 35 secured thereto in order to hold said bolt against transverse movement in either direction.

To the ends of the pivot bolt 32, the upper ends of two supporting legs 36 are pivotally attached, nuts being applied to the threaded extremities of said pivot bolt and bearing against the outer sides of said legs. An axle member 37 is arranged between the lower extremities of said supporting legs and by means of bolts 38 which are passed through the lower extremities of said supporting legs and threaded axially into said axle member, traction or supporting wheels or rollers 39 are mounted for rotation, said bolts serving as stub axles for said traction wheels or rollers.

40 designates two curved links, one arranged at each side of the semi-trailer. Said links have the guide bolt 34 passed through their upper ends, and these links are held in spaced relation at their upper ends by means of a spacing tube or sleeve 41. The links are therefore pivotally attached at their upper ends to said guide bolt, and their lower ends are pivotally secured to a spacing bolt 42 passing through the supporting legs at suitable points between their upper and lower ends. A suitable spacing bushing 43 is interposed between the outer face of each link and the inner face of the adjacent supporting leg, while a spacing tube or sleeve 44 is arranged around said tie bolt and has opposite ends in contact with the inner faces of said links at their lower ends. Nuts 45 are applied to the threaded extremities of said spacing bolt and bear against the outer sides of said supporting legs.

Each of the actuator slides 21 has forwardly extending lugs 46 through which an actuator bar 47 is passed. This bar is adapted to be engaged by the rear edge of the pivoted platform on the tractor, or by some other portion of the tractor, when positioning the tractor underneath the front end of the semi-trailer so that the actuator slides are forced rearwardly while moving the tractor into proper position underneath the semi-trailer. This rearward movement of said actuator slides cause the supporting legs to be swung upwardly from the position shown in Fig. 4 to that shown in Fig. 7, as will presently be explained. If desired, the actuator slides may be moved rearward manually by grasping the actuator bar 47 and exerting pressure in a rearward direction, or by any other approved means. The supporting legs are therefore adapted to be actuated either manually or automatically when connecting the trailer to a tractor.

With the parts in normal position, as shown in Fig. 4, the pivot bolt 32 of the supporting legs is at the upper ends of the upwardly and rearwardly directed slots 24 of the slide guides 17 and at the rear ends and within the rear horizontal portions 31 of the inclined slots 29 arranged in the actuator slides 21, and by reason of the slots 24 and 29 being arranged at different angles, as clearly shown in Fig. 4, the pivot bolt is locked against movement, since the slot 24 prevents movement in a horizontal direction while the slot 29 prevents movement in a vertical direction.

The guide bolt 34 is arranged at the front end of the upwardly and rearwardly-directed slots 25 of the slide guides 17 and within the vertical extension 26 thereof, and also at the lower ends of the arcuate slots 27 formed in the actuator slides 21, and since the lower ends of the arcuate slots trend rearwardly and substantially in a horizontal plane while the front or lower ends of the slots 25 are in a vertical plane, said guide bolt is also locked against movement for the reason that the vertical extensions 26 at the front ends of the slots 25 prevent movement of said guide bolt in a horizontal direction while the rearwardly and substantially horizontally trending lower ends of said arcuate slots prevent movement of said guide bolt in a vertical direction.

With the supporting legs 36 in vertical or operative positions and braced by the curved links 40, said supporting legs are retained in lowered or operative positions and it is necessary that pressure be exerted on both the pivot bolt and the guide bolt in substantially the same direction—in this instance rearwardly—before the positions of the supporting legs and the bracing links thereof can be changed. This necessitates operation of the actuator slides 21 by any means whereby said slides may be moved rearwardly on or within the slide guides 17, and while this may be accomplished by manually moving said slide guides rearwardly by grasping the actuator bar 47 connecting the front ends of said slides and forcing the same rearwardly, I preferably utilize said actuator bar as a contact or buffer device against which the pivoted platform or some other portion of the tractor is adapted to engage when moving the rear end of the tractor underneath the front end of the trailer. However, any other suitable means for operating said actuator slides may be employed without departing from the principle of my invention. For example, when the tractor is moved rearwardly under its own power, the rear end of the pivoted platform 11 will engage the actuator bar 47 and exert pressure rearwardly thereagainst, thereby causing the actuator slides to move rearwardly, the upper walls of the inclined slots 29 to travel in contact with the pivot bolt while the outer or front and bottom walls of the arcuate slots 27 will travel in contact with the guide bolt. The pivot bolt 32 is thus moved downwardly and inwardly within the upwardly and rearwardly-directed slots 24 in the slide guides by the upper walls of the inclined slots 29 in the actuator slides while the guide bolt 34 is moved upwardly and rearwardly by the outer or front and lower walls of the arcuate slots, the pivot bolt being carried downwardly to the lower ends of the upwardly and rearwardly-directed slots 24 while the guide bolt is carried upwardly and rearwardly by the upwardly and rearwardly-directed slots 25 and the upper portions of the arcuate slots 27, thus swinging the guide bolt to a higher and more rearward position, while the pivot bolt is moved downwardly and slightly forwardly. This action causes the curved links 40 to swing the supporting legs upwardly and rearwardly to the position shown in Fig. 7.

It is to be noted that the upper or rear ends of the inclined slots 29 of the actuator slides are in the same horizontal plane as the upper ends of the upwardly and rearwardly-directed slots 24 of the slide guides and that the lower or front ends of said slots 29 are in the same horizontal plane as the lower ends of said slots 24; also that the upper or rear ends of the upwardly and rearwardly-directed slots 25 of the slide guides 17 are in the same horizontal plane as the upper ends of the arcuate slots 27 in the actuator slides while the lower or front ends of said slots 25 are in the same plane as the lower end of said arcuate slots. Consequently, when the supporting legs are elevated or in inoperative position, the pivot bolt and the guide bolt are locked against movement by reason of the parts of the coöperating slots in which said bolts are positioned trending in different directions; that is to say, the front or lower ends of the inclined slots 29 are in horizontal planes or substantially so, while the lower ends of the upwardly and rearwardly directed slots 24 are substantially in vertical planes and the upper ends of the arcuate slots 27 are substantially in vertical planes while the rear ends of the upwardly and rearwardly-directed slots 25 are at an angle to the vertical.

The two slots 24 and 25 in each of the slide guides may be termed "guide slots," since they guide the movements of the pivot bolt and guide bolt, while the two slots 27 and 29 in each of the actuator slides may be termed "actuator or cam slots," since they cause movement of the pivot bolt and guide bolt within the slots of the slide guides.

The supporting device may be moved to lowered or operative position in any one of several different ways. For example, the lower ends of the supporting legs may be weighted or the traction rollers mounted thereon may be sufficiently heavy to serve as weights so that when the tractor is being uncoupled from the semi-trailer and the platform 11 of the tractor moved out of contact with the actuator bar 47, the supporting device under its own weight may gravitate to operative position. But it is apparent from the arrangement of the guide slots within the slide guides and the actuator or cam slots within the actuator slides, that this would necessitate applying considerable weight to the supporting legs in order to cause the actuator slides to move forwardly, since this forward action would have to be effected by the guide bolt acting against the front walls of the arcuate cam slots. However, I desire it to be understood that I do not limit myself to the particular formation of guide and cam slots, arranged respectively in the slide guides and actuator slides, and that it is fully within the province of my invention to change the formation of these slots or to substitute equivalents therefor, although I consider the arrangement herein shown and described to be highly efficient for the purpose intended. Where, however, reliance is placed upon the supporting legs being automatically returned to operative or lowered position when removing the tractor from underneath the front end of the semi-trailer, it may be desirable to change the formation of these slots in order to provide a free-acting self-lowering device without unduly weighting the supporting legs. I, however, prefer the construction of guide and cam slots herein shown and described, and intend with the particular construction, arrangement, and combination of parts shown in the drawings, that the supporting legs be lowered by manually exerting pressure against said legs and forcing the same downwardly, or by grasping the actuator bar at the front end of the actuator slides and drawing said actuator slides forwardly, which will cause the lowering of the supporting legs, and under either of these two last-mentioned methods, this must be effected before the tractor has been entirely freed from the trailer.

While in the preferred construction illustrated in Figs. 1 to 7, the traction wheels or rollers of the supporting legs are maintained on fixed transverse axes, I have shown in Figs. 8 and 9 a modification wherein the traction wheels or rollers of the supporting legs are swiveled. In this modification the lower ends of the supporting legs, designated by the reference character 36", are connected by a transverse connecting bar or member 48, to which is secured by means of a pivot pin 49, the axle 50 on which the traction wheels or rollers 39' are mounted. In preferred form the traction wheels or rollers 39' are rotatable on bolts 38' fastened into axial bores 51 arranged in opposite ends of the axle, said bolts being fastened within said axles by means of bolts or set screws 52 passing through curved slots 53 formed at opposite ends of the connecting member and having their center co-axial with the center on which the axle swings. For this purpose the ends of the connecting member 48 are widened so that the curved slots will be of sufficient length to permit the axle to swivel on the pivot pin 49 through an arc of a circle of sufficient length to permit the trailer to be steered or directed from a straight line when disconnected from a tractor.

The construction described prevents the turning of the axle to an angle which would tend to cause the semi-trailer to tip, the swiveling movement of the axle being restricted by the length of the slots in the connecting member of the supporting legs.

I wish here to state that the supporting member is substantially as wide as the body of the trailer which it supports, and when using a swivel axle under the principle embodied in Figs. 7 and 8 the radius or swing of the axle is limited so that at either of its extreme positions it will properly support the front end of the trailer while permitting the trailer to be moved from a straight path.

I have described the principle of operation of my invention in accordance with the provisions of the patent statutes, together with the mechanism or means which I now consider to represent the preferred embodiments thereof, but I desire to have it understood that many changes could be made in the construction and arrangement of parts herein shown and described without departing from the scope of this invention, and that it is furthermore evident that the particular form and arrangement of guide and cam slots within the slide guides and the actuator slides and the parts coöperating therewith are not essential to the more general features of the invention although they form thoroughly practical means for operating a representative form of supporting mechanism under the principle involved, and it is intended that all matter contained in the above description or shown in the accompanying drawings shall be interpreted as illustrative and not in a limiting sense.

Having thus described my invention, what I claim is:—

1. A supporting mechanism for trailers, comprising a supporting element, and slidable mechanism connected to said supporting element and adapted to be actuated by a tractor to move said supporting member into non-supporting position when connecting the trailer to the tractor.

2. A supporting mechanism for trailers, comprising a movable supporting element, horizontally slidable means including self-retaining means whereby said slidable means is held at the ends of its movements, and connection between said slidable means and said supporting element whereby said supporting element is moved into operative or inoperative position.

3. A supporting mechanism for trailers, comprising a supporting element pivotally and slidably connected at its upper end to said trailer, slidable elements mounted on said trailer, and connection between said slidable elements and said supporting element whereby said supporting element is lowered or elevated, as may be desired.

4. A supporting mechanism for trailers, comprising a transverse pivot member, a supporting member pivotally secured to said transverse pivot member, and slidable means connected to said supporting member and adapted to be actuated automatically for moving said supporting member into non-supporting position when connecting the trailer to a tractor.

5. Supporting mechanism for trailers, comprising a pivoted supporting member, slidable actuating means including cam elements, and mechanism connecting said slidable actuating means with said supporting member and adapted to be actuated by said cam elements.

6. The combination with a trailer, of guides secured to said trailer, movable elements guided in their movements by said guides, a movable supporting member, and mechanism connecting said movable elements with said supporting member and actuated by said movable elements to move said supporting element from operative to inoperative positions, or reversely.

7. The combination with a trailer, of guides on said trailer, a supporting member pivotally connected at its upper end to said trailer and normally in vertical position to support said trailer, slidable elements guided by said guides and having cam slots therein, and operative connection between said slidable elements and said supporting member operated by said cam slots upon movement of said slidable elements.

8. The combination with a trailer, of a pair of parallel spaced guides arranged longitudinally on said trailer, actuator slides guided by said guides, a supporting member pivotally connected at its upper end to said guides, and connection between said actuator slides and said supporting member.

9. The combination with a trailer, of a pair of parallel spaced guides arranged longitudinally on said trailer, a supporting member pivotally connected at its upper end to said guides, actuator slides guided for movement in said guides, and connecting members between said actuator slides and said supporting member, said connecting members being pivotally connected to said supporting member a distance below the pivotal point thereof.

10. Supporting mechanism for trailers, comprising two spaced guides, actuator slides on said guides, a pivot element passing through said guides and actuator slides, a supporting member having its upper end connected to said pivot element, and links pivotally connected to said actuator slides and to said supporting member.

11. Supporting mechanism for trailers, comprising two spaced guides having pivot guiding means, an actuator slide carried by each guide and having pivot actuating means, pivoted supporting legs, and connecting means between said supporting legs and said actuator slides, said connecting means having pivotal connection with said actuator slides, the pivots of said supporting legs and said connecting means being guided by the pivot guiding means of said guides and actuated by the pivot actuating means of said slides.

12. Supporting mechanism for trailers, comprising two spaced guides having guide slots therein, actuator slides on said guides having actuator slots therein, a pivoted supporting member having its pivot passing through said guide and actuator slots, and connecting means pivotally connected to said actuator slides and to said supporting member.

13. Supporting mechanism for trailers, comprising two spaced guides having guide slots therein, actuator slides on said guides having actuator slots therein, a supporting member pivotally attached to said guides, and connecting means between said supporting member and said actuator slides, said connecting means having pivotal connection to said actuator slides with the pivots thereof passing through said guide and actuator slots.

14. A supporting member comprising a guide provided with two guide slots, an actuator slide provided with two actuator slots, a pivoted supporting member having its pivot passing through coöperating guide and actuator slots, and connecting means between said supporting member and said actuator slide having pivotal connection with said actuator slide and passing through coöperating guide and actuator slots.

15. Supporting mechanism for trailers, comprising a guide having pivot-guiding means, an actuator member movable on said guide and having pivot location-changing means, a pivoted supporting member, and means pivotally connecting said supporting member with said actuator member, the locations of the pivots of said supporting member and said connecting means being changed by said pivot location-changing means when actuating said actuator member.

16. Supporting mechanism for trailers, comprising a pair of spaced longitudinal guides adapted for connection to a trailer, each guide being provided with pivot guiding means, actuator slides carried by said guides, a pivot bolt extending from guide to guide and passing through said actuator slides, a supporting member attached at its upper end to said pivot bolt, a guide bolt extending from guide to guide and passing through said actuator slides, and links pivotally connecting said supporting member a distance from said pivot bolt with said guide bolt.

17. A supporting member for trailers, comprising a pair of spaced guides adapted to be secured to a trailer, actuator slides carried by said guides and having pivot-actuating means thereon, a pivot bolt and a guide bolt, both co-acting with said pivot actuating means, a supporting member attached to said pivot bolt, and a link pivotally connected at one end to said supporting member and at its other end to said guide bolt.

18. Supporting mechanism for trailers, comprising guide members, slide members carried by said guide members, a supporting member pivotally connected to said guide member and movable into operative and inoperative positions by said slide members, and means for retaining the supporting member in either operative or inoperative position.

19. Supporting mechanism for trailers, comprising guide members, slide members carried by said guide members, a supporting member pivotally connected to said guide members and movable into operative and inoperative positions by said slide member, and coöperating means on said guide and slide members for retaining said supporting member in operative or inoperative position.

20. Supporting mechanism for trailers, comprising a pair of spaced guide members, each having a pair of slots therein, a pair of actuators guided for movement on said guides and each having a pair of slots therein, each slot of said actuators coöperating with a slot of one of said guides, a pivoted supporting member having its pivot bolt passing through two pairs of coöperating slots in said guide members and actuators, links pivotally connected at their lower ends to said supporting member and having pivots at their upper ends, each of said last-mentioned pivots passing through coöperating slots in one of said guide members and actuators, the slots of said guides and actuators having portions trending in different directions to retain the supporting member in operative position when lowered and in inoperative position when elevated.

21. Supporting mechanism for trailers, comprising a pair of spaced guide members, each having an upwardly and rearwardly-directed slot a distance from its front end and an upwardly and rearwardly-directed slot as its rear end, a pair of actuators guided for movement on said guide members and each having an inclined slot at its front end provided with horizontal end portions and an arcuate slot at its rear end provided with a substantially vertical portion at its upper end, a pivoted supporting member having traction rollers and having its pivot passing through the slots at the front ends of said guide members and actuators, and links pivotally connected at their lower ends to said supporting member and having pivots attheir upper ends passing through the slots at the rear end of said guide members and actuators.

22. Supporting mechanism for trailers, comprising guide members, slide members carried by said guide members, a supporting member pivotally connected to said guide member and adapted for vertical swinging movement, said supporting member having traction wheels or rollers at its lower end, and coöperating means on said guide and slide members for guiding said supporting member in its swinging movements and for causing said supporting member to swing when said slide members are actuated.

23. Supporting mechanism for trailers, comprising a supporting member having two supporting legs connected at their lower ends by a transverse member, an axle member pivoted centrally to said transverse member, traction wheels or rollers mounted at the outer ends of said axle members, and means for operating said supporting member for swinging the same from operative to inoperative position, or reversely.

24. Supporting mechanism for trailers, comprising a vertically swinging member pivotally connected at its upper end to said trailer and having arcuate slots at its lower end, a horizontally swinging axle member pivotally connected to said vertically swinging member and having stop means passing through said arcuate slots, and traction wheels or rollers rotatably mounted on the ends of said axle member.

25. Supporting mechanism for trailers, comprising a pivoted supporting member including an axle member pivotally secured and adapted for limited movement and traction wheels or rollers mounted on said axle member.

26. Supporting mechanism for trailers, comprising a vertically swinging supporting member including an axle pivotally secured between its ends, means at opposite ends of said axle member to limit the pivotal swinging movement of said axle member, and traction wheels or rollers mounted on said axle member.

27. Supporting mechanism for trailers, comprising a supporting member horizontally pivoted to swing in a vertical plane and having an axle vertically pivoted to swing in a horizontal plane and means to limit the horizontal swinging movement of said axle member.

28. Supporting mechanism for trailers, comprising a vertically swinging supporting member substantially as wide as the body of the trailer and having a horizontally swinging axle member and means for limiting the swinging movement of said axle member.

29. Supporting mechanism for trailers, comprising two legs pivotally connected to the trailer, a rigid connection between the lower ends of said legs, an axle member pivotally connected at a point between its ends to said rigid member, means on said rigid member to limit the swinging movement of said axle member, and rotatable traction elements at the outer ends of said axle member.

30. Supporting mechanism for trailers, comprising a vertically swinging supporting member including a horizontally swinging axle member at the lower end thereof, said axle member having rotatable traction elements at its outer ends and having its length substantially equaling the width of the body of the trailer so as to support the full width of said body.

31. Supporting mechanism for trailers, comprising a pivoted supporting member attached to and extending the full width of the body of said trailer, said supporting member including an axle member at its lower end pivoted for swinging movement and means to limit the swinging movement of said axle member.

32. A supporting member for trailers having a pivoted axle member at its lower end, and means for limiting the swinging movement of said axle member.

In testimony whereof I affix my signature.

ANDREW J. BORST, Jr.

DISCLAIMER 1,383,381.—*Andrew J. Borst, jr.*, Buffalo, N. Y. SEMITRAILER. Patent dated July 5, 1921. Disclaimer filed May 8, 1931, by the assignee, *Fruehauf Trailer Company*.

Hereby enters this disclaimer:

Petitioner disclaims any and all supporting mechanism specified in claim 2 except such wherein the horizontally slidable means is actuated by a portion of the tractor when backing the rear end of the tractor underneath the front end of the trailer, to move the slidable means rearwardly, thereby causing the movable supporting element to move upwardly into inoperative position.

Disclaims all supporting mechanism specified in claim 3 except such wherein the slidable elements are actuated by the tractor when backing under the front end of the trailer to thereby elevate the supporting element.

Disclaims all trailer structures specified in claim 6 except where the movable elements are automatically actuated by the tractor in backing under the front end of the trailer to automatically move the supporting element from operative to inoperative position.

Disclaims all trailer structures specified in claim 8 except where the actuator slides are automatically moved rearwardly when the tractor is backed underneath the trailer to automatically raise the supporting member to its inoperative position.

Disclaims all supporting mechanism claimed in claims 18, 19, and 22, except that in which the slide members are adapted to be actuated by a portion of the tractor when the same is backed under the forward end of the trailer to thereby move the slide members rearwardly and cause the supporting member to be moved upwardly into inoperative position.

[*Official Gazette May 26, 1931.*]

DISCLAIMER 1,383,381.—*Andrew J. Borst, jr.*, Buffalo, N. Y. SEMITRAILER. Patent dated July 5, 1921. Disclaimer filed February 17, 1934, by the assignee, *Fruehauf Trailer Company*.

Hereby disclaims claims 2, 3, 8, 18, 19 and 22.

[*Official Gazette March 13, 1934.*]